United States Patent [19]

Cone

[11] Patent Number: 4,986,376

[45] Date of Patent: Jan. 22, 1991

[54] WEIGH PLATE QUICK RELEASE MOUNT

[75] Inventor: Richard E. Cone, Cambridge, Ohio

[73] Assignee: NCR Corporation, Dayton, Ohio

[21] Appl. No.: 444,353

[22] Filed: Dec. 1, 1989

[51] Int. Cl.⁵ .................... G01G 21/22; G01G 21/28
[52] U.S. Cl. .................................. 177/128; 177/229; 177/243
[58] Field of Search ..................... 177/128, 229, 243

[56] References Cited

U.S. PATENT DOCUMENTS

| | | | |
|---|---|---|---|
| 2,598,812 | 6/1952 | Marco et al. | 177/243 X |
| 4,273,203 | 6/1981 | Blawert et al. | 177/229 X |
| 4,291,776 | 9/1981 | Kupper et al. | 177/229 |
| 4,411,327 | 10/1983 | Lockery et al. | |
| 4,489,797 | 12/1984 | Gordon . | |
| 4,574,899 | 3/1986 | Griffin . | |
| 4,619,337 | 10/1986 | Behrend et al. | |
| 4,666,006 | 5/1987 | Wernimont . | |
| 4,673,800 | 6/1987 | Hirai et al. | 177/229 X |
| 4,726,435 | 2/1988 | Kitagawa et al. | 177/229 X |
| 4,798,251 | 1/1989 | Maaz et al. | 177/229 |

FOREIGN PATENT DOCUMENTS 2028520  3/1980  United Kingdom ............... 177/128

Primary Examiner—George H. Miller, Jr.
Attorney, Agent, or Firm—Wilbert Hawk, Jr.; Albert L. Sessler, Jr.; Richard W. Lavin

[57] ABSTRACT

A quick release weigh plate for a weighing device includes a support member to which is secured a pair of cantilever load beam cells for generating electrical signals representing the weight of an object placed on the load beam cells. The load beam cells each include a support portion which extends through an aperture in the support member on which is removably mounted a cover for supporting the object to be weighed. One of the support portions has a truncated slotted end on which is removably mounted a U-shaped saddle member secured to the cover preventing any unnecessary movement of the cover when mounted on the load beam cells while allowing the cover to be easily removed when necessary. The other support portion has its end removably positioned within an aperture in the cover.

6 Claims, 6 Drawing Sheets

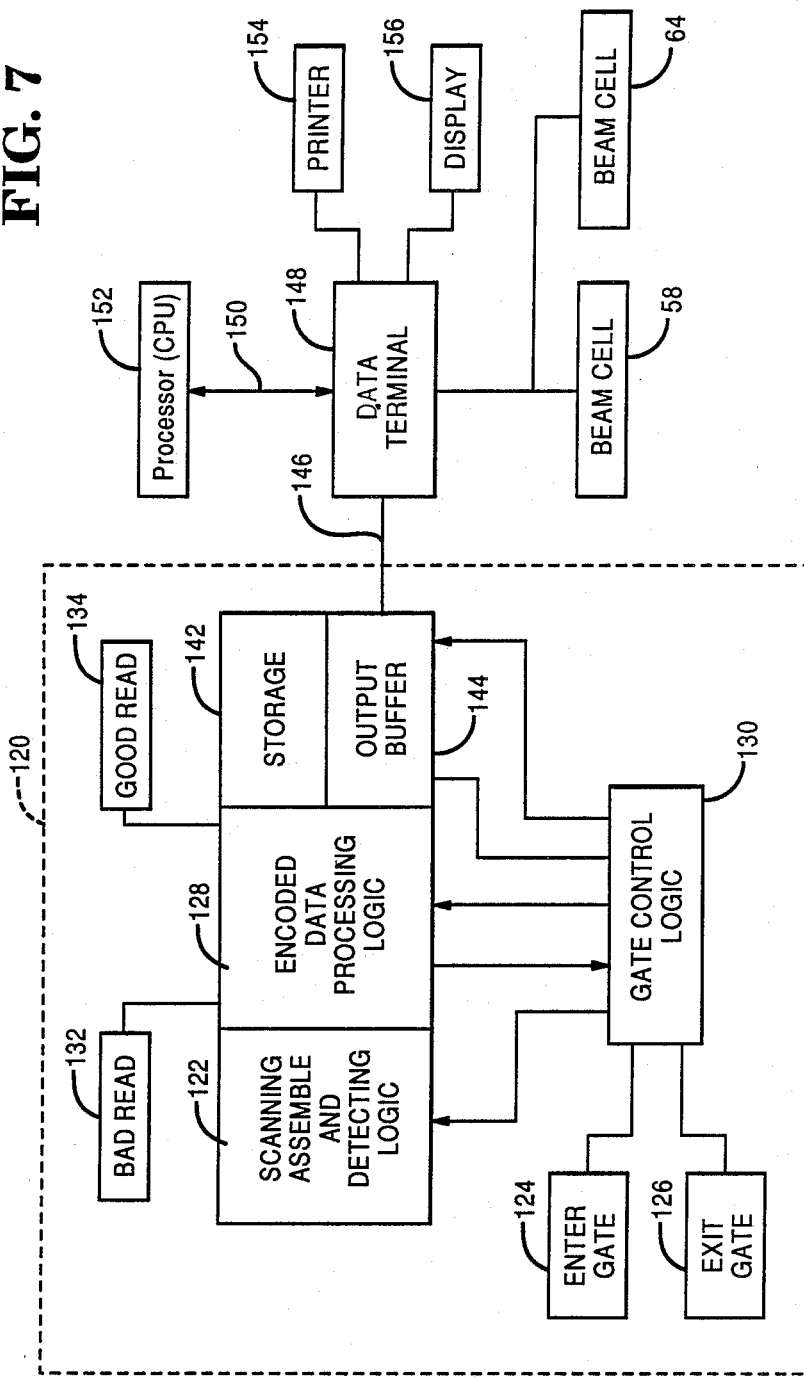

4,986,376

WEIGH PLATE QUICK RELEASE MOUNT

BACKGROUND OF THE INVENTION

This invention relates to a scanning/weighing apparatus which is used, for example, with a retail terminal as part of a checkout operation in which a coded label on a purchased merchandise item is read by the scanning/weighing apparatus.

Present day checkout systems, found in supermarkets or the like, include an optical scanning unit located within the checkout counter housing for scanning bar code labels on merchandise items which are moved across a window area in the top surface of the counter. The optical scanning unit translates the bar code labels into electrical data signals which can be used to identify the merchandise item and its price. Further included in the system is a data terminal device and an electronic scale, positioned away from the optical scanning unit, for weighing produce and other types of merchandise items which are sold by weight. In determining the price of such merchandise items, prior checkout operations have required the checkout operator to remove the item to be weighed from the checkout counter and place it on the electronic scale for a weighing operation which results in a generation of data representing the weight. If a bar code label is not affixed to the merchandise item, a keyboard entry into the data terminal is also required to identify the merchandise item. The data so generated is then used by the data terminal device to calculate the purchase price of the merchandise item, to display the price and to print the price on a customer's receipt.

In order to reduce the number of movements required by the operator to check out the various types of merchandise items and to increase the speed of the checkout operation, the scale has been incorporated as part of the optical bar code reader and mounted within the checkout counter. An example of such an arrangement is disclosed in the U.S. Pat. No. 4,656,344 which is assigned to the assignee of the present application.

One of the problems found with such a scanning/weighing apparatus is that the scanning unit gets dusty or dirty and needs to be cleaned periodically. It is especially important that the scanning/weighing unit be dissembled and assembled quickly to allow the cleaning operation to be accomplished in the minimum amount of time. As fully disclosed in the previously cited United States Patent, the weighing plate is mounted on four load cells associated with the weighing beam assemblies used for weighing the merchandise items on the scale. The major portion of the overall cost of the scale is the load cells. It would be desirable to reduce the number of load cells required to produce a low cost scale without affecting the accuracy of the scale.

SUMMARY OF THE INVENTION

There is provided a checkout counter having an end portion and a movable cover having an aperture therein supported on the end portion of the counter. An optical scanner is positioned in the end portion of the counter adjacent the cover for projecting scanning light beams through the aperture for scanning a coded label on any merchandise item positioned on the cover and for generating first data signals identifying the merchandise item. A support member is mounted in the end portion of the counter adjacent the cover and a pair of load cells are mounted on the support member, engaging the cover, for generating second data signals representing the weight of the merchandise item positioned on the cover. A processor is connected to the optical scanner and the load cells for generating third data signals representing the price of the merchandise item in response to the generation of the first and second data signals.

It is therefore a principal object of this invention to provide a low cost scale member mounted in association with an optical bar code reader for weighing a purchase merchandise item having a coded label which is scanned by the associated bar code reader.

Another object of this invention is to provide a low cost unitary structure that will both weigh merchandise items and scan bar code labels.

BRIEF DESCRIPTION OF THE DRAWINGS

These and other objects, features and advantages of the invention, as well as the invention itself, will become more apparent to those skilled in the art in light of the following detailed description, taking into consideration with the accompanied drawings, wherein like reference numerals indicate like or corresponding parts throughout the several views and wherein:

FIG. 7 is a block diagram of the checkout system of the present invention.

DESCRIPTION OF THE PREFERRED EMBODIMENT

Figure 1:
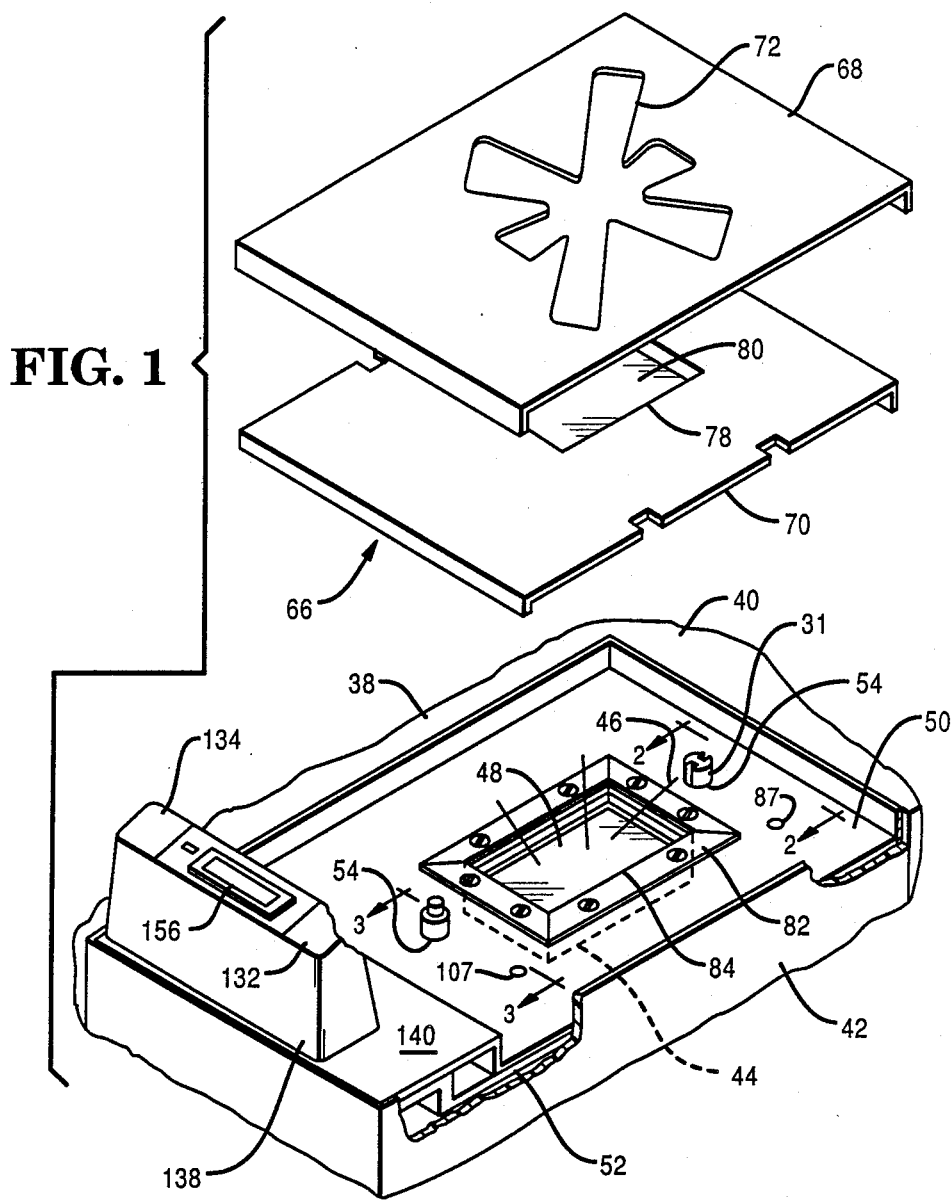
FIG. 1 is an exploded perspective view of the preferred embodiment of the present invention.

Referring now to FIG. 1, there is shown an exploded view of the checkout system of the present invention which includes a checkout counter 38 having a top supporting surface 40 for supporting purchased merchandise items. The counter 38 further includes an end portion 42 in which is located an optical scanner unit 44 for projecting scanning light beams 46 through a window segment 48 located in the counter. The end portion of the counter 38 further includes a plastic support plate member 50 (FIGS. 1-5 inclusive) which is detachably mounted within the end portion 22 of the checkout counter by any conventional means (not shown). Secured to the support plate member 50 in any conventional matter such as screws is a metal support plate member 52. The plate members 50 and 52 include a pair of cut-out portions 54 in which are mounted the cap member 56 of a load beam cell assembly generally indicated by the numeral 58 (FIG. 2) and the cap 60 member of a second load beam cell assembly generally indicated by the numeral 64 (FIG. 3). A cover assembly 66 (FIGS. 1-3 inclusive) is mounted on the ends of the cap members 56 and 60. The cover assembly 66 is composed of a plastic cover member 68 and an aluminum top plate member 70.

The plastic cover member 68 includes an aperture 72 (FIG. 1) through which the scanning light beams 46 from the optical scanning unit 44 are projected. The top plate member 70 has a recessed portion 78 in which is mounted a sealed window segment 80. The window segment 80 is mounted in registry with the window segment 48 mounted in a frame member 82 positioned within a recessed portion 84 in the plate members 50 and 52.

Figure 2:
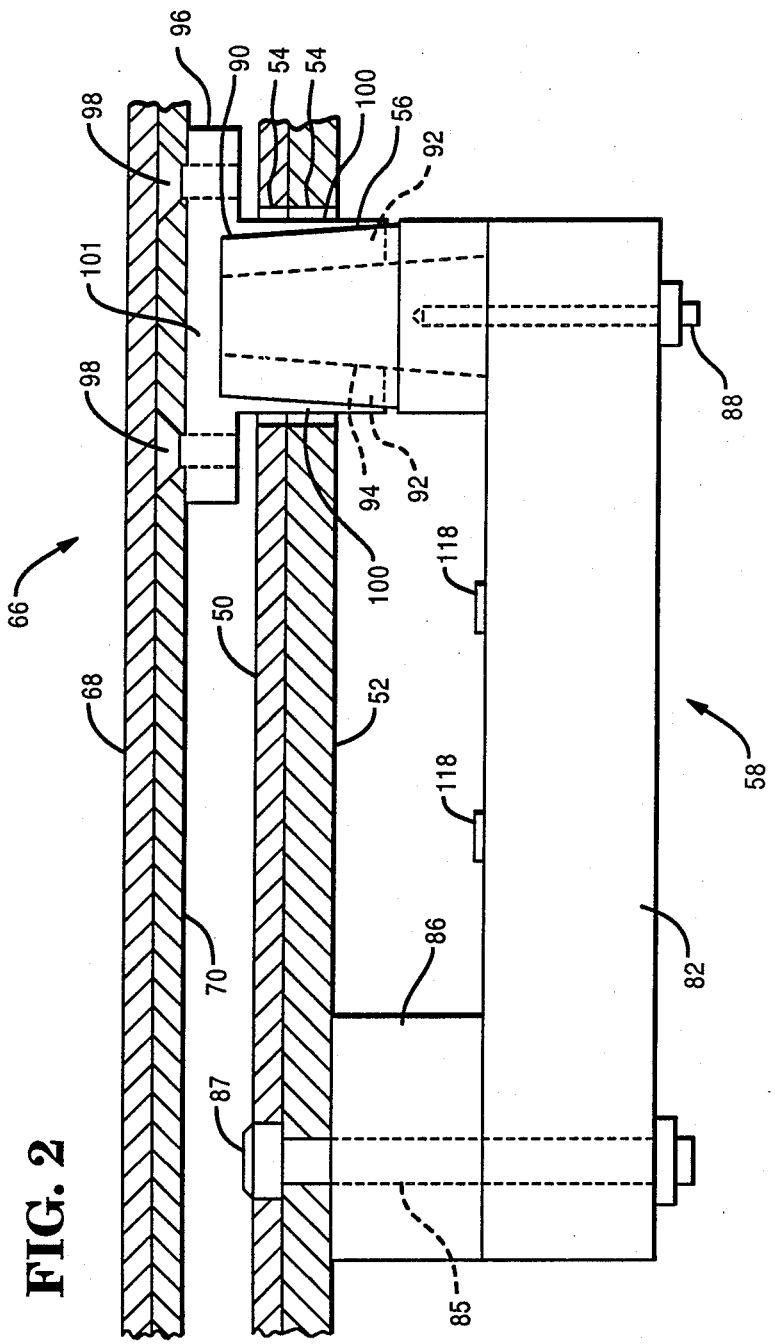
FIG. 2 is a partial sectional view taken on the section lines 2—2 of FIG. 1 showing one of the load beam cells.
Figure 3:
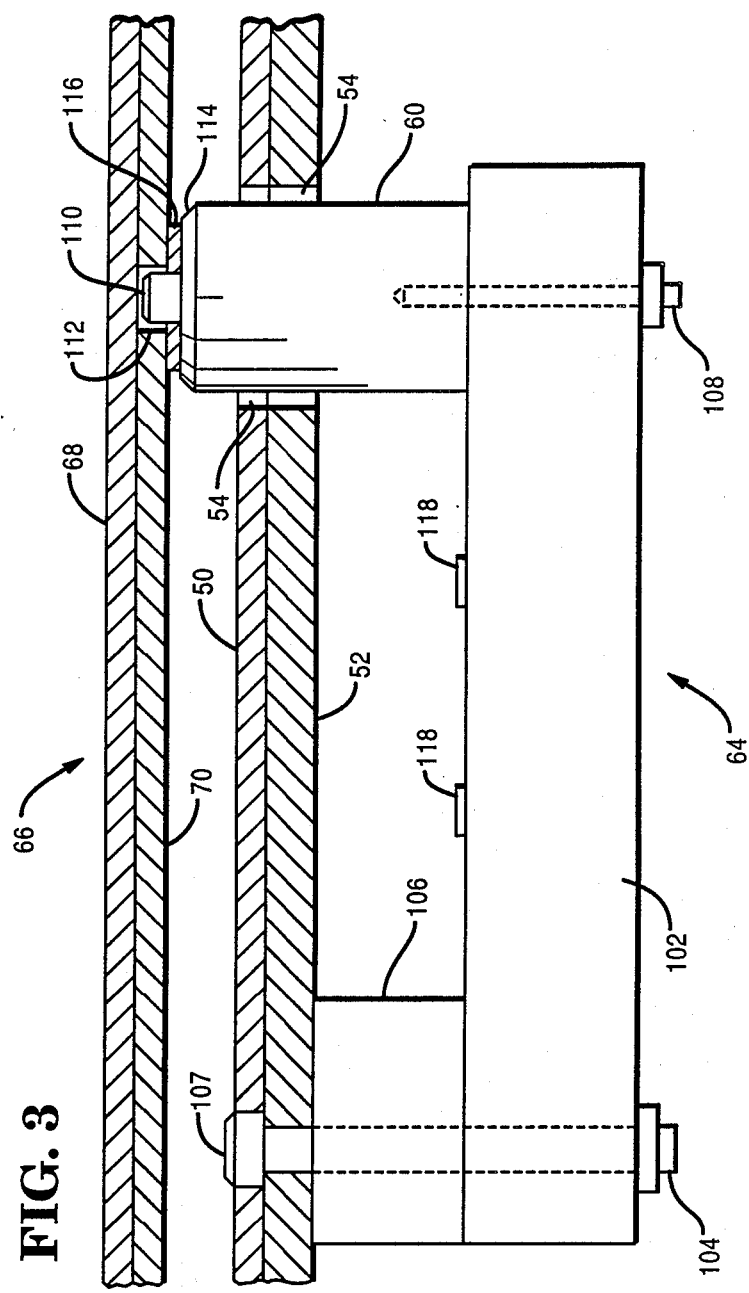
FIG. 3 is a partial sectional view taken on the section lines 3—3 of FIG. 1 showing the second load beam cell.
Figure 4:
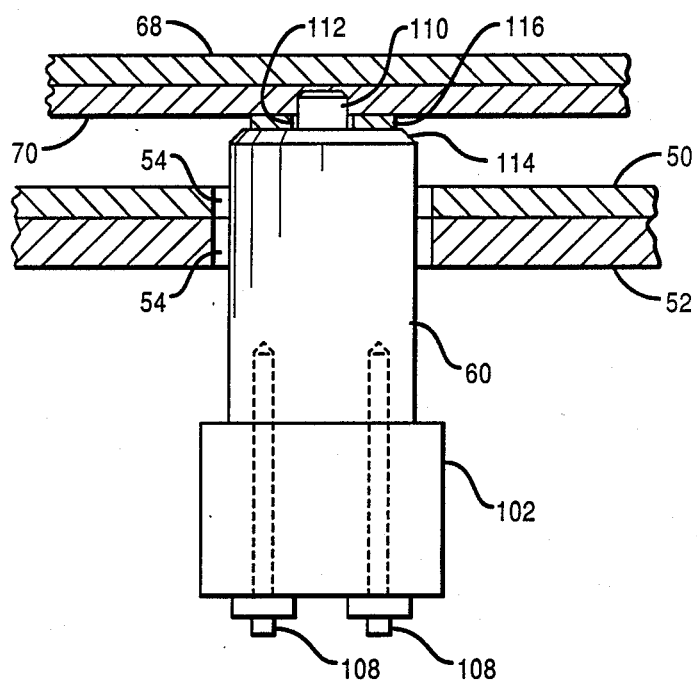
FIG. 4 is an end view of the load beam cell shown in FIG. 3.
Figure 5:
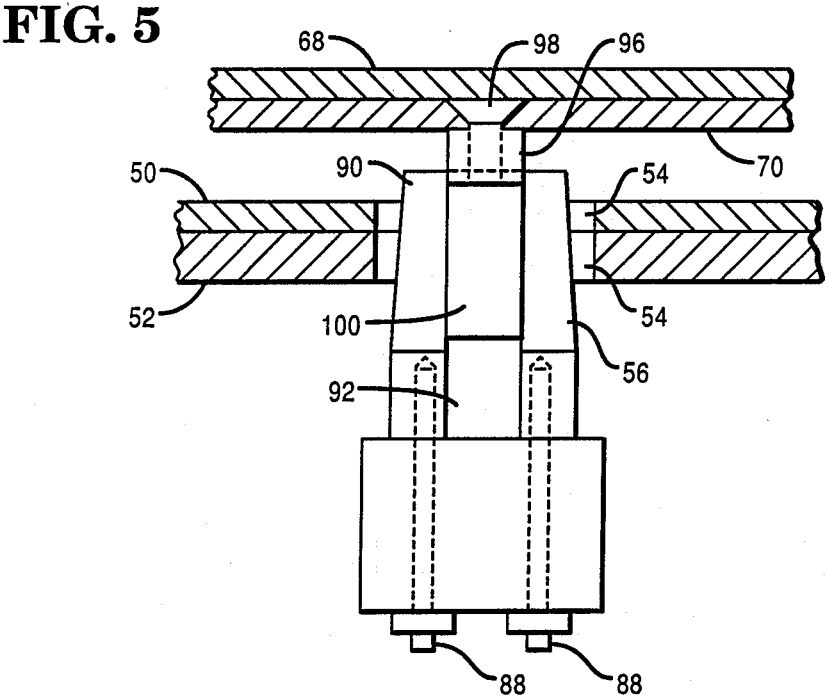
FIG. 5 is an end view of the load beam cell shown in FIG. 2.

Referring now to FIG. 2, there is shown a partial sectional view of the load beam cell assembly 58 which comprises a first steel cantilever support member 82 secured by a pair of screw members 85 extending through an aluminum spacer member 86 to position the head portion 87 of the screw members 85 in the plate member 50. The first cantilever support member 83 is also secured to the cap member 56 by means of screw members 88 (FIGS. 2 and 5).

Secured to the top surface of the cantilever support members 82 and 102 of the beam cell assemblies 58 and 64 respectively are two wire strain gage members 118 which, upon the bending of the support members during a weighing operation, produces a corresponding deformation of the strain gage wire. This deformation results in the strain gage members producing an electrical signal whose output level is proportional to the amount the wire is deformed. The electrical signal is used in generating data signals representing the weight of the merchandise item positioned on the cover member 68 in a manner that is well known in the art.

Figure 6:
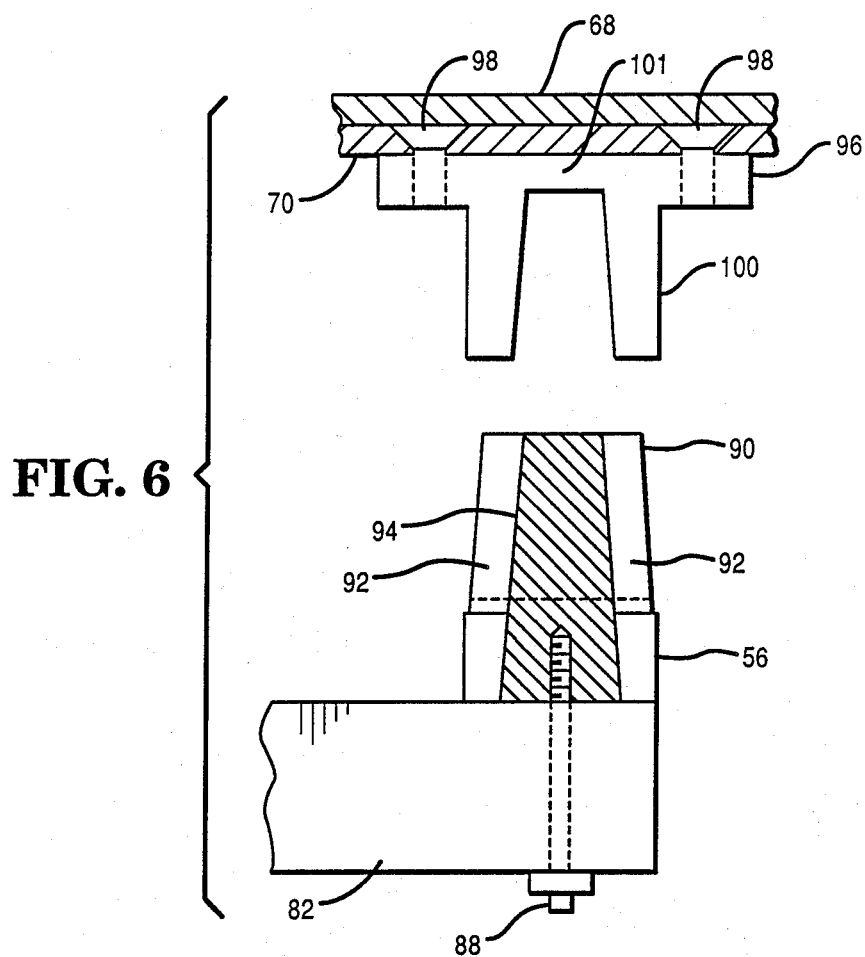
FIG. 6 is an exploded partial side view of a portion of the support plates and one of the load beam cells on which they are positioned with a portion of the cap member being partially removed.

As best seen in FIGS. 2 and 6, the cap member 56 has a truncated top portion 90 which includes a pair of end slots 92 forming a similar shaped truncated inner portion 94. The cap member 56 coacts with a saddle member 96 secured by means of screw members 98 to the lower surface of the top plate member 70. The saddle member 96 includes a U-shaped depending leg portion 100 which is shaped to conform to the outer dimensions of the truncated inner portion 94 of the cap member 56 and to the slots 92 and a top portion 101. The top portion 101 of the saddle member 96 extends in a direction which is coplanar with the slots 92. When the saddle member 96 is mounted on the cap member 56 with the leg portion 100 positioned within the slots 92, the slots 92 prevent any lateral movement of the top plate member 70 with respect to the cap member 56 while the top portion 101 of the saddle member 96 prevents any rotational movement of the top plate member in a vertical plane about the cap member 56.

Referring now to FIG. 3, there is shown a partial side sectional view of the second load beam cell assembly 64 which includes a steel cantilever support member 102 secured by a pair of screw members 104 extending through an aluminum spacer member 106 to position the head portion 107 of the screw member in the plate members 50 and 52. The cantilever support member 102 is also secured by means of the screw members 108 (FIGS. 3 and 4) to the cap member 60 which extends through the cut-out portions 54 in the plate members 50 and 52. Mounted in the top of the cap member 60 is a pin member 110 which is positioned within an aperture 112 (FIGS. 3 and 4) located in the top plate member 70. Mounted on the top surface 114 of the cap member 60 is a plastic washer 116 for transmitting the weight of the merchandise item positioned on the cover member 68 to the cap member 60. The washer 116 may be composed of any type of hard plastic material such as polycarbonate.

Referring now to FIG. 7, there is shown a block diagram of the data processing system employed in the present invention. Included in the data processing system is a bar code scanning unit 120, shown within the dotted lines and located in the checkout counter 38. Included in this unit is a scanning assembly and detecting logic unit 122 which includes the optical scanning unit 44 (FIG. 1) for reading and converting the scanned bar codes into digital signals. Further included in the scanning unit 120 are the following: an item enter gate 124 for detecting the entrance of a merchandise item onto the cover member 68; an item exit gate 126 for detecting the removable of the merchandise item from the cover member 68; an encoded data processing logic unit 128 for checking and decoding the signals read by the detecting logic unit 122 and for generating a signal to a gate control logic unit 130 indicating the validity of the read operation and a bad read indicator 132 and a good read indicator 134 located in a housing 138 (FIG. 1) mounted on a shelf portion 140 of the plate member 50. The scanning unit 120 further includes a conventional storage unit 142 and an output buffer unit 144 for transmitting the data signals read by the detecting logic unit 122 over line 146 to a data terminal device 148. For a more complete description of the scanning unit 44, reference should be made to FIG. 2 of U.S. Pat. No. 4,086,476 and its associated description. The aforementioned U.S. patent is assigned to the assignee of the present application.

The data terminal device 148 transmits the data signals received over line 146 from the buffer 144 to a processor unit (CPU) 152. The data signals represent an item identification number which will be used by the processor unit 152 to retrieve from a price look-up table (not shown) the price per pound for the weighed merchandise item. The data terminal device 148 also receives signals from the beam cell assemblies 58 (FIG. 2) and 64 (FIG. 3) representing the weight of the merchandise item positioned on the cover member 68 (FIG. 1). The signals are transmitted to the processor unit 152. The processor unit 152, in response to receiving the signals from the data terminal device 148, generates data signals representing the price per pound of the item which are transmitted back to the terminal device 148 which in turn operates a printer 154 to print the price data on a record member and a customer's receipt member. The terminal device 148 also operates the display 156 located in the housing 138 (FIG. 1) causing the display to display the price of the item which is viewed by the customer.

It will be seen that the mounting structure for the top plate member 70 enables the top plate member to be quickly and easily removed to allow the scale to be cleaned from any debris that has been found on either of the window segments 80 and 48 (FIG. 1). The presence of debris on the window segment would interfere with the light beams being projected through the windows preventing the scanning unit from performing a good read operation.

While the principles of the invention have now been made clear in an illustrative embodiment, it will be obvious to those skilled in the art that many modifications of structure, arrangements, elements and components can be made which are particularly adapted for specific environments and operating requirements without departing from those principles. The appended claims are therefore intended to cover and embrace any such modifications, within the limits only of the true spirit and scope of the invention.

What is claimed is:

1. An apparatus for weighing an article comprising:
    a first support member;
    support means mounted on said first support member including a plurality of first apertures;
    signal generating means including first and second load beam members secured to said support means;
    said load beam members each including a second support member extending through one of said first apertures to a position above said load beam members:
    cover means removably mounted on each of said second support members for supporting an article to be weighed;
    said second support member of the first load beam including a truncated end portion; and
    a connecting member secured to the cover means including an engaging portion positioned on said truncated end portion preventing any movement of the cover assembly on the load beam cells.

2. The apparatus of claim 1 in which the cover means includes a second aperture and the second support member of the second load beam has an end portion removably positioned within the second aperture for supporting the cover means in a stable condition.

3. The apparatus of claim 1 in which the truncated end portion of the second support member includes a vertically extending slotted portion in which the engaging portion of the connecting member is positioned to prevent any lateral movement of the cover means on the load beam cells.

4. The apparatus of claim 3 in which the engaging portion of the connecting member comprises a U-shaped depending leg member which is positioned within the slotted portion of the truncated end portion of the second support member.

5. The apparatus of claim 4 in which the connecting member includes an elongated connecting portion which is mounted to the cover means, said connecting portion extending in a direction which is coplanar with the slotted portion to prevent rotational movement of the cover means in a vertical plane around the connecting member.

6. The apparatus of claim 5 in which each of the load beam members comprise a cantilever beam assembly secured at one end to said support means, said assembly including a beam member and a spacer member secured at one end of the beam member and to the undersurface of said support means positioning the beam member adjacent the support means.

* * * * *